3,310,590
HEPTAALKYLCYCLOHEXADIENES AND PROCESS OF PREPARATION
George Suld, Springfield, Pa., assignor to Sun Oil Company, Philadelphia, Pa., a corporation of New Jersey
No Drawing. Filed Nov. 22, 1963, Ser. No. 325,755
10 Claims. (Cl. 260—666)

This invention relates in one aspect to 1,1,2,3,4,5,6-heptaethylcyclohexadiene-2,5 as a new composition of matter. The invention also relates to a method of preparing this and other heptaalkylcyclohexadienes by a catalytic hydrogenation reaction which can be indicated as follows:

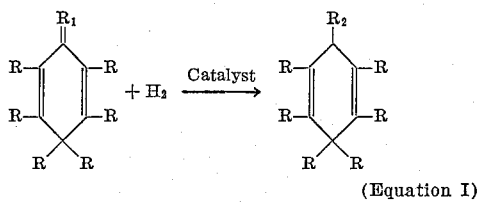

(Equation I)

wherein each R is methyl or ethyl, $R_1$ is ethylidene or methylene, and $R_2$ is ethyl or methyl, $R_2$ being ethyl when $R_1$ is ethylidene and being methyl when $R_1$ is methylene. When all R's are ethyl and $R_1$ is ethylidene, the starting material is 1-ethylidene-2,3,4,4,5,6-hexaethylcyclohexadiene-2,5 and it is hydrogenated by the method of the invention to the novel composition of the invention, i.e., to 1,1,2,3,4,5,6-heptaethylcyclohexadiene-2,5. An important feature of the reaction which is involved in the method of the invention is the surprising and wholly unexpected discovery that under conditions described in more detail hereinafter the hydrogenation of the $R_1$ radical can be effected without any substantial hydrogenation of either of the two double bonds in the cyclohexadiene ring, i.e., the hydrogenation is completely selective for the unsaturation in the $R_1$ radical. In other words, within the specified conditions, the hydrogen consumption does not exceed one mole per mole of starting material (even though an excess may be used) and, further, the hydrogen consumption is solely at the unsaturation in the $R_1$ radical. In addition to being selective, the hydrogenation reaction occurs in substantially quantitative yield, one mole of starting material yielding substantially one mole of heptaalkylcyclohexadiene product.

According to the method of the invention the reaction shown in Equation I is effected by contacting the starting material with hydrogen at a temperature in the range of 10°–200° C., a hydrogen pressure in the range of 0–300 p.s.i.g., and in the presence of a hydrogenation catalyst. The reaction is normally complete in 1–10 minutes.

The starting materials of the invention can be prepared by known techniques, such as those described in U.S. Patent 2,951,879 issued Sept. 6, 1960 to Edwards et al. As described in this patent 1-methylene-2,3,4,4,5,6-hexamethylcyclohexadiene is prepared by a procedure which involves alkylating benzene or a methyl substituted benzene such as xylene, tetramethylbenzene, etc. with methyl chloride in the presence of a Friedel-Crafts catalyst, preferably anhydrous aluminum chloride. Preferably the starting material is benzene containing at least 3 methyl substituents. The alkylation is conducted in an inert atmosphere, at a temperature 50°–300° F., preferably 175°–200° F., and at a pressure of 0–50 p.s.i.g., preferably atmospheric pressure. Preferably 1 mole of catalyst per mole of benzenoid starting material is employed. When consumption of methyl chloride ceases the reaction mixture is cooled to room temperature. Two phases exist, a heavier complex phase containing a complex of the catalyst and the cyclohexadiene product and a lighter oil phase. The complex phase is separated and is then hydrolyzed with ice water whereby a water insoluble hydrolysis product is formed. The hydrolysis product is recovered by extraction with ligroin after which the ligroin solution is extracted with concentrated hydrochloric acid. The acid solution is separated and any insoluble matter therein separated and discarded. The acid phase is then neutralized which effects the precipitation of the 1-methylene-2,3,4,4,5,6-hexamethylcyclohexadiene-2,5 product.

Similarly, 1-ethylidene-2,3,4,4,5,6-hexaethylcyclohexadiene-2,5 is prepared by alkylating benzene or an ethyl substituted benzene with ethyl chloride under the conditions described above. Preferably the benzenoid starting material is benzene containing at least three ethyl substituents. 1-ethylidene-2,3,4,4,5,6-hexaethylcyclohexadiene can also be prepared by alkylating benzene with ethylene in the presence of HF and $BF_3$ as catalyst, at an ethylene pressure of 500 p.s.i.g. and at a temperature of 25° C. The mole ratio of HF to benzene is preferably about 4:1 and the mole ratio of $BF_3$ to benzene is preferably about 1:1. The reaction is complete in 5–20 minutes. Recovery of 1-ethylidene-2,3,4,4,5,6-cyclohexadiene is effected by a procedure which involves quenching the reaction mixture in ice and separating the resulting hydrocarbon layer from the aqueous acid layer. The hydrocarbon layer contains 70–80% 1-ethylidene-2,3,4,-4,5,6-hexaethylcyclohexadiene and 20–30% hexaethylbenzene. The latter can be separated by fractional crystallization at −10° to −20° C. to leave substantially pure 1-ethylidene-2,3,4,4,5,6-hexaethylcyclohexadiene-2,5.

Where the starting material in the present invention contains both methyl and ethyl groups, i.e., where some of the R radicals in the starting material shown in Equation I are methyl groups and others are ethyl groups, such a starting material can be obtained by alkylating, according to the procedure described in the aforesaid patent, a methyl substituted benzene with ethyl chloride or an ethyl substituted benzene with methyl chloride. Another suitable procedure is alkylating, in the manner described in the aforesaid patent, a methylethyl benzene with either methyl chloride or ethyl chloride.

As previously described the hydrogentation of the invention is carried out in the presence of a catalyst. Any conventional hydrogenation catalyst can be used, examples of which are platinum, nickel, palladium, rhodium, and sulfides of tungsten or molybdenum. Platinum is the preferred catalyst. The catalyst can be used either alone or deposited on a conventional carrier such as alumina, diatomaceous earth, silica, etc. The amount of catalyst employed will vary depending upon the specific catalyst and upon the manner in which the reaction is conducted. If the reaction is conducted in a batch operation the amount of catalyst will normally be 0.5–20% by weight of the starting material. If the reaction is effected by passing the starting material through a column of catalyst, in which case the catalyst will normally be supported by a carrier, the amount of catalyst will usually be 0.1–10% by weight of the carrier and the flow rate of starting material through the catalyst will normally be 0.2–10 volumes of starting material per hour per volume of catalyst.

The hydrogenation of the invention is carried out at a temperature in the range of 10°–200° C., preferably 20°–100° C. Within these ranges the optimum temperature is influenced somewhat by the specific catalyst employed. Lower temperatures can be used with the more active hydrogenation catalyst such as platinum than with the less active catalysts such as nickel. Temperatures much higher than 200° C. are to be avoided in order to avoid any decomposition of the starting material and to avoid hydrogenation of the cyclohexadiene ring.

The pressure at which the hydrogenation is carried out should be 0–300 p.s.i.g. Preferably the pressure is 15–150 p.s.i.g. As with the temperature the optimum pressure is influenced somewhat by the specific catalyst employed, lower pressures being employed with the more active catalysts and higher pressures being employed with the less active catalysts. In addition, the optimum pressure varies inversely with the temperature employed, the pressure desirably being increased as the temperature employed decreases.

The hydrogenation is preferably carried out in the presence of an inert solvent for the starting material. The various starting materials of the method of the invention have melting points ranging from less than 10° C. to about 40° C. Above their melting points they are viscous liquids. The use of a solvent is desirable in that it facilitates handling of the starting material, contact of the starting material with the catalyst and with the hydrogen reactant, etc. Where no solvent is employed the reaction is preferably carried out at a temperautre above the melting point of the starting material. Solvents suitable for the present purpose include saturated hydrocarbons such as heptane, octane, cyclohexane, and cycloheptane, and alcohols containing 1–5 carbon atoms such as methanol, ethanol, butanol, etc.

The hydrogenation is normally complete in 1–30, usually 1–10, minutes. Longer reaction times can be employed if desired because once the amount of reacted hydrogen, i.e., the hydrogen which combines with the starting material, reaches one mole per mole of starting material, no further reaction takes place. Since this is the case one method of following the progress of the reaction is by observing the hydrogen consumption. When the consumption has reached one mole per mole of starting material the reaction is stopped and the hydrogenation product is recovered.

The reaction product consists substantially solely of the heptaalkylcyclohexadiene-2,5 shown in Equation I supra. Occasionally trace amounts of the heptaalkylcyclohexadiene-2,4 isomer are present. There will of course be unreacted starting material in the reaction product if the hydrogenation is not allowed to proceed to completion. Where a solvent is used it remains unchanged, of course, and is present in the reaction product mixture. As described previously the formation of the heptaalkylcyclohexadiene-2,5 product occurs without any hydrogenation of the cyclohexadiene ring unsaturation.

Any catalyst particles present in the reaction product can be separated by any convenient procedure such as filtration. Where a solvent was employed it is readily separated from the reaction product by distillation.

The following example illustrates the method of the invention and the preparation of the novel composition of the invention.

*Example*

30 grams (0.11 mole) of 1-ethylidene-2,3,4,4,5,6-hexaethylcyclohexadiene, a viscous liquid at room temperature, is mixed with 25 mls. absolute ethanol. With the resulting solution is slurried 2 gms. of a commercial platinum dioxide hydrogenation catalyst which under the reaction conditions is reduced to platinum metal. The slurry is charged to a shaking type bomb maintained at room temperature (25° C.). The bomb is pressured to 60 p.s.i.g. with hydrogen and is shaken for 30 minutes during which time the hydrogen pressure is maintained at 60 p.s.i.g. At the end of the 30 minute period the bomb is opened and the reaction product mixture removed. Catalyst particles are separated from the mixture after which the ethanol solvent is removed by distillation at 100° C. The product remaining weighs 28.5 grams, thus the yield is 95%. It is analyzed by nuclear magnetic resonance, infra-red, and ultraviolet light and found to be solely 1,1,2,3,4,5,6-heptaethylcyclohexadiene-2,5. By these same analytical techniques it is determined that no unreacted starting material is present and that no ethylated cyclohexenes or ethylated cyclohexanes are present. In other words there is no hydrogenation of the cyclohexadiene ring in the starting material. The product is a colorless viscous oil having a molecular weight of 276 and a boiling point of 137°–138° C. at 0.9 mm. Hg abs. It is useful as an antioxidant for mineral oils and for forming coordination compounds with various organometallic materials by chelation.

Analogous results are obtained when other starting materials of the type specified herein are employed under the specified reaction conditions.

The invention claimed is:

1. Method which comprises contacting a substituted cyclohexadiene having a structure (I)
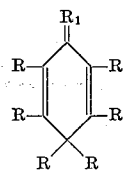

wherein R is selected from the group consisting of methyl and ethyl and $R_1$ is selected from the group consisting of methylene and ethylidene with hydrogen in the presence of a hydrogenation catalyst, at a temperature of 10° to 200° C., at a hydrogen pressure of 0 to 300 p.s.i.g., and recovering as a hydrogenation product a compound having a structure (II)
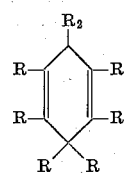

wherein R is as in I and $R_2$ is selected from the group consisting of methyl and ethyl.

2. Method according to claim 1 wherein all R's in both I and II are ethyl, $R_1$ is ethylidene, and $R_2$ is ethyl.

3. Method according to claim 2 wherein the temperature is 20°–100° C.

4. Method according to claim 2 wherein the hydrogen pressure is 15–150 p.s.i.g.

5. Method according to claim 2 wherein the catalyst is platinum.

6. Method which comprises
   (1) catalytically reacting a substituted cyclohexadiene having a structure (I)
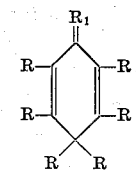

wherein R is selected from the group consisting of methyl and ethyl and $R_1$ is selected from the group consisting of methylene and ethylidene with not more than 1 mole of hydrogen per mole of said substituted cyclohexadiene, said catalytically reacting being at a temperature of 10° to 200° C., at a hydrogen pressure of 0 to 300 p.s.i.g., and in the presence of a catalyst selected from the group consisting of platinum, nickel, palladium, rhodium, sulfides of tungsten and sulfides of molybdenum, whereby there is formed a reaction product which contains a substituted cyclohexadiene having a structure (II) 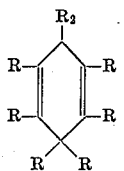

wherein R is as in I and $R_2$ is selected from the group consisting of methyl and ethyl and which is substantially free of substituted cyclohexene and substituted cyclohexanes, and (2) recovering a substituted cyclohexadiene having the structure II from said reaction product.

7. Method according to claim 6 wherein all R's in both I and II are ethyl, $R_1$ is ethylidene, and $R_2$ is ethyl.

8. Method according to claim 7 wherein the catalyst employed in said reacting is platinum.

9. Method according to claim 7 wherein said catalytically reacting is effected at a temperature of 20°–100° C. and a hydrogen pressure of 15–150 p.s.i.g.

10. The compound 1,1,2,3,4,5,6-heptaethylcyclohexadiene-2,5.

References Cited by the Examiner
UNITED STATES PATENTS 2,951,879   9/1960   Edwards et al. _____ 260—666
3,113,986   12/1963  Breslow et al. _____ 260—667

DELBERT E. GANTZ, *Primary Examiner.*

S. P. JONES, *Assistant Examiner.*